(12) United States Patent
Hilbert et al.

(10) Patent No.: US 10,995,861 B2
(45) Date of Patent: May 4, 2021

(54) CANTILEVERED HYDROSTATIC ADVANCED LOW LEAKAGE SEAL

(71) Applicant: United Technologies Corporation, Farmington, CT (US)

(72) Inventors: Brian F. Hilbert, Coventry, CT (US); Daniel L. Gysling, South Glastonbury, CT (US); Eric A. Grover, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 65 days.

(21) Appl. No.: 16/239,226

(22) Filed: Jan. 3, 2019

(65) Prior Publication Data
US 2020/0217420 A1 Jul. 9, 2020

(51) Int. Cl.
*F01D 11/02* (2006.01)
*F16J 15/44* (2006.01)
*F01D 11/00* (2006.01)

(52) U.S. Cl.
CPC .......... *F16J 15/441* (2013.01); *F01D 11/003* (2013.01)

(58) Field of Classification Search
CPC ......... F01D 11/003; F01D 11/08; F16J 15/44; F16J 15/441
See application file for complete search history.

(56) References Cited

U.S. PATENT DOCUMENTS

| | | |
|---|---|---|
| 1,187,212 A | 6/1916 | Westinghouse |
| 3,594,010 A | 7/1971 | Warth |
| 3,847,403 A | 11/1974 | Thiesler et al. |
| 4,017,088 A | 4/1977 | Lerjen |
| 4,213,656 A | 7/1980 | Olschewski et al. |
| 4,428,587 A | 1/1984 | Forch |
| 4,998,739 A | 3/1991 | Weiler |
| 5,626,347 A | 5/1997 | Ullah |
| 6,250,640 B1 | 6/2001 | Wolfe et al. |
| 6,338,490 B1 | 1/2002 | Bainachi |
| 6,669,443 B2 | 12/2003 | Burnett et al. |
| 7,410,173 B2 | 8/2008 | Justak |
| 7,896,352 B2 | 3/2011 | Justak |
| 8,002,285 B2 | 8/2011 | Justak |
| 8,172,232 B2 | 5/2012 | Justak |
| 8,474,827 B2 | 7/2013 | Grondahl |

(Continued)

FOREIGN PATENT DOCUMENTS

| | | |
|---|---|---|
| EP | 3009611 A1 | 4/2016 |
| EP | 3009612 A1 | 4/2016 |

(Continued)

OTHER PUBLICATIONS

European Search Report Application No. 19220241.4; dated Jun. 17, 2020.

(Continued)

*Primary Examiner* — Gilbert Y Lee

(74) *Attorney, Agent, or Firm* — Cantor Colburn LLP

(57) ABSTRACT

A hydrostatic seal configured to be disposed between relatively rotatable components is provided. The seal includes a seal housing. The seal also includes a shoe extending axially from a forward end to an aft end to define an axial length, the shoe cantilevered to the seal housing at one of the forward end and the aft end, the shoe free at the other end.

14 Claims, 3 Drawing Sheets

(56) References Cited

U.S. PATENT DOCUMENTS

| | | | |
|---|---|---|---|
| 8,600,707 | B1 | 12/2013 | El-Aini et al. |
| 8,641,045 | B2 | 2/2014 | Justak |
| 8,919,781 | B2 | 12/2014 | Justak |
| 9,045,994 | B2 | 6/2015 | Bidkar et al. |
| 9,115,810 | B2 | 8/2015 | Bidkar et al. |
| 9,255,642 | B2 * | 2/2016 | Bidkar .................. F01D 11/04 |
| 9,359,908 | B2 | 6/2016 | Bidkar et al. |
| 9,587,746 | B2 | 3/2017 | Bidkar et al. |
| 9,988,921 | B2 | 6/2018 | Wilson et al. |
| 10,030,531 | B2 | 7/2018 | Peters |
| 10,094,232 | B2 | 10/2018 | McCaffrey et al. |
| 10,208,615 | B2 | 2/2019 | Peters |
| 2003/0080513 | A1 | 5/2003 | Kirby, III et al. |
| 2005/0200080 | A1 | 9/2005 | Baghdadi et al. |
| 2008/0122183 | A1 | 5/2008 | Braun et al. |
| 2008/0265513 | A1 | 10/2008 | Justak |
| 2013/0234399 | A1 | 9/2013 | Justak |
| 2013/0241153 | A1 | 9/2013 | Garrison |
| 2014/0008871 | A1 * | 1/2014 | Bidkar ................. F04D 29/164 277/303 |
| 2014/0062024 | A1 * | 3/2014 | Bidkar .................. F16J 15/442 277/303 |
| 2014/0117624 | A1 | 5/2014 | Bidkar et al. |
| 2014/0119912 | A1 | 5/2014 | Bidkar et al. |
| 2015/0159498 | A1 | 6/2015 | Mukhopadhyay et al. |
| 2016/0097294 | A1 | 4/2016 | Wilson et al. |
| 2016/0108750 | A1 | 4/2016 | Wilson et al. |
| 2016/0109025 | A1 | 4/2016 | McCaffrey et al. |
| 2016/0115804 | A1 | 4/2016 | Wilson et al. |
| 2017/0248236 | A1 | 8/2017 | Simpson et al. |
| 2017/0306780 | A1 * | 10/2017 | Peters ................... F16J 15/441 |
| 2018/0058240 | A1 | 3/2018 | Chuong et al. |
| 2020/0217215 | A1 | 7/2020 | Grover et al. |
| 2020/0217216 | A1 | 7/2020 | Grover et al. |
| 2020/0217421 | A1 | 7/2020 | Hilbert et al. |
| 2020/0217422 | A1 | 7/2020 | Grover et al. |

FOREIGN PATENT DOCUMENTS

| | | |
|---|---|---|
| EP | 2580498 B1 | 8/2016 |
| EP | 3290756 A1 | 3/2018 |
| WO | 0155624 A1 | 8/2001 |
| WO | 2014022290 A1 | 2/2014 |
| WO | 2015147967 A1 | 10/2015 |

OTHER PUBLICATIONS

European Search Report for Application No. EP 19 21 9634; dated May 26, 2020.

European Search Report for Application No. EP 19 22 0248.

U.S. Non Final Office Action dated May 15, 2020 for U.S. Appl. No. 16/239,611.

U.S. Non Final Office Action dated May 29, 2020 for U.S. Appl. No. 16/239,242.

U.S. Non Final Office Action dated May 29, 2020 for U.S. Appl. No. 16/239,616.

U.S. Non-Final Office Action dated May 14, 2020 for U.S. Appl. No. 16/239,231.

European Search Report for Application No. EP 19 21 9629.

Europeasn Search Report Application No. EP 19 21 9645; dated Jun. 4, 2020.

* cited by examiner

CANTILEVERED HYDROSTATIC ADVANCED LOW LEAKAGE SEAL

BACKGROUND

Exemplary embodiments pertain to the art of gas turbine engines and, more particularly, to a cantilevered hydrostatic seal.

Hydrostatic seals exhibit less leakage compared to traditional knife edge seals while exhibiting a longer life than brush seals. Some hydrostatic seals may be used between a stator and a rotor within a gas turbine engine. The hydrostatic seal is mounted to the stator to maintain a desired gap dimension between the hydrostatic seal and the rotor. The hydrostatic seal has the ability to 'track' the relative movement between the stator and the rotor throughout the engine operating profile when a pressure differential is developed across the seal.

Hydrostatic seals involve motion of a spring-attached shoe whose response is based on aerodynamic forces developed between the seal shoe and a rotor surface during operation. When properly designed, the hydrostatic seal will maintain tight clearances across the operating range of the engine. At operating conditions with high pressure differentials across the seal, though, the hydrostatic seal may have an inherent issue with friction that could result in the seal "locking-up" and not moving in response to aerodynamic loads on the seal. The immobilized seal could experience accelerated wear and excessive heat generation during maneuver operations where the rotor surface is moving relative to the static hydrostatic seal.

BRIEF DESCRIPTION

Disclosed herein is a hydrostatic seal configured to be disposed between relatively rotatable components. The seal includes a seal housing. The seal also includes a shoe extending axially from a forward end to an aft end to define an axial length, the shoe cantilevered to the seal housing at one of the forward end and the aft end, the shoe free at the other end.

In addition to one or more of the features described above, or as an alternative, further embodiments may include that the shoe is cantilevered to the seal housing at the forward end of the shoe.

In addition to one or more of the features described above, or as an alternative, further embodiments may include that the seal housing comprises a first segment extending radially and a second segment extending axially rearward from the first segment, the shoe cantilevered to the first segment.

In addition to one or more of the features described above, or as an alternative, further embodiments may include that the shoe includes a plurality of teeth extending radially from a sealing surface of the shoe.

In addition to one or more of the features described above, or as an alternative, further embodiments may include that the shoe is cantilevered to the seal housing at the aft end of the shoe.

In addition to one or more of the features described above, or as an alternative, further embodiments may include that the seal housing comprises a first segment extending radially and a second segment extending axially forward from the first segment, the shoe cantilevered to the first segment.

In addition to one or more of the features described above, or as an alternative, further embodiments may include a third segment extending radially from a forward end of the second segment, the seal housing including a discourager feature extending axially from the third segment, the shoe including a radially extending segment disposed proximate the discourager feature.

In addition to one or more of the features described above, or as an alternative, further embodiments may include that the shoe extends circumferentially to define an overall length of the shoe that is greater than an axial length of the shoe.

Also disclosed is a seal assembly disposed in a gas turbine engine. The seal assembly includes a first component. The seal assembly also includes a second component, the first component and the second component relatively rotatable components. The seal assembly further includes a first hydrostatic seal disposed between the first component and the second component. The seal includes a seal housing. The seal also includes a shoe extending axially from a forward end to an aft end to define an axial length, the shoe cantilevered to the seal housing at one of the forward end and the aft end, the shoe free at the other end.

In addition to one or more of the features described above, or as an alternative, further embodiments may include that the shoe is cantilevered to the seal housing at the forward end of the shoe.

In addition to one or more of the features described above, or as an alternative, further embodiments may include that the seal housing comprises a first segment extending radially and a second segment extending axially rearward from the first segment, the shoe cantilevered to the first segment.

In addition to one or more of the features described above, or as an alternative, further embodiments may include that the shoe includes a plurality of teeth extending radially from a sealing surface of the shoe.

In addition to one or more of the features described above, or as an alternative, further embodiments may include that the shoe is cantilevered to the seal housing at the aft end of the shoe.

In addition to one or more of the features described above, or as an alternative, further embodiments may include that the seal housing comprises a first segment extending radially and a second segment extending axially forward from the first segment, the shoe cantilevered to the first segment.

In addition to one or more of the features described above, or as an alternative, further embodiments may include a third segment extending radially from a forward end of the second segment, the seal housing including a discourager feature extending axially from the third segment, the shoe including a radially extending segment disposed proximate the discourager feature.

In addition to one or more of the features described above, or as an alternative, further embodiments may include that the shoe extends circumferentially to define an overall length of the shoe that is greater than an axial length of the shoe.

In addition to one or more of the features described above, or as an alternative, further embodiments may include that the first component is a stator and the second component is a rotor.

In addition to one or more of the features described above, or as an alternative, further embodiments may include that the seal is operatively coupled to the rotor.

Further disclosed is a gas turbine engine including a compressor section, a combustor section, a turbine section, and a seal assembly disposed in the gas turbine engine, the seal assembly comprising a stator, a rotor, and a first hydrostatic seal disposed between a stator and the rotor. The seal includes a seal housing. The seal also includes a shoe extending axially from a forward end to an aft end to define an axial length, the shoe cantilevered to the seal housing at one of the forward end and the aft end, the shoe free at the other end, the seal assembly not including a spring element disposed between the shoe and the seal housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
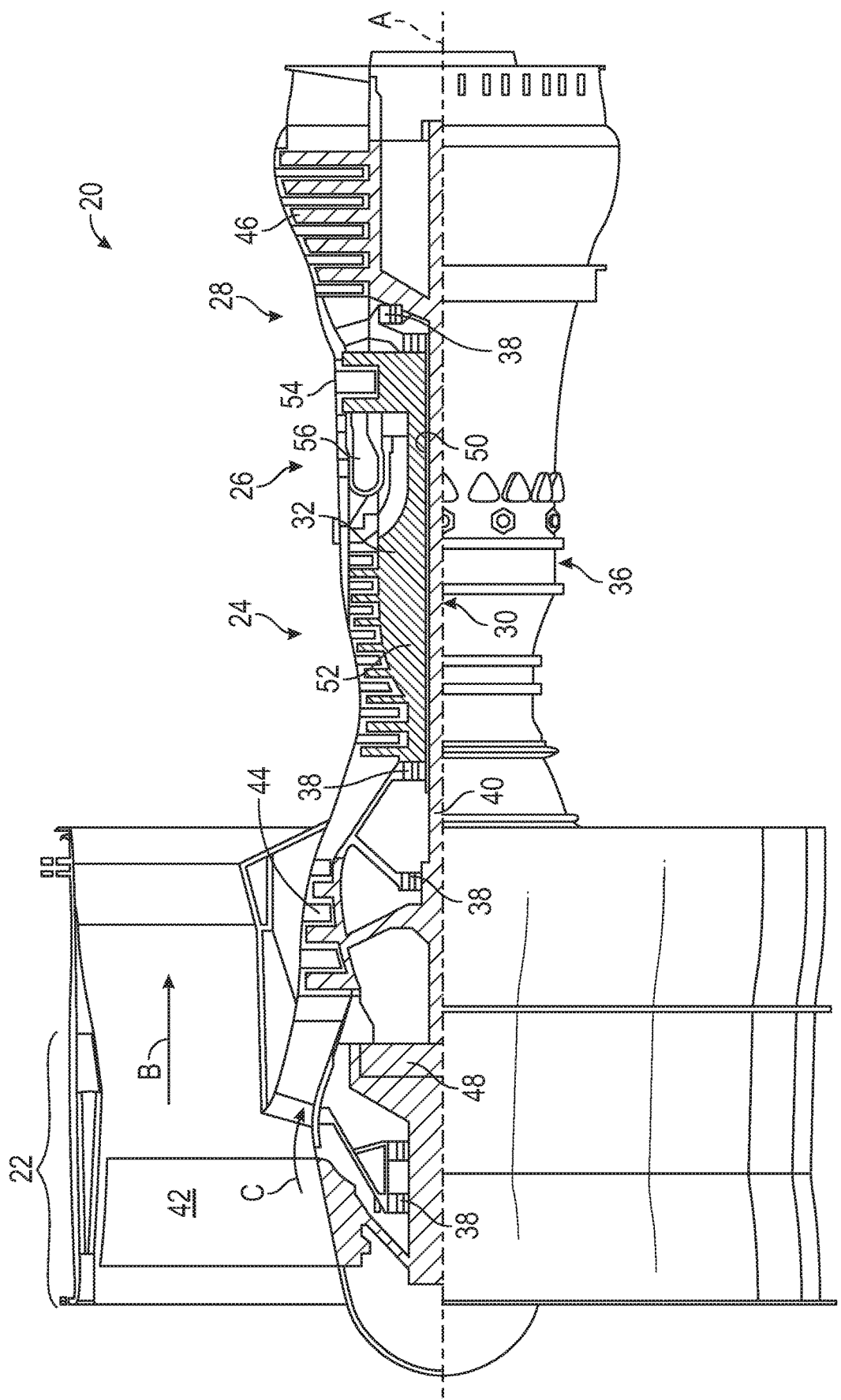
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°R)]^{0.5}$. The "Low corrected fan tip speed" as disclosed herein according to one non-limiting embodiment is less than about 1150 ft/second (350.5 m/sec).

Figure 2:
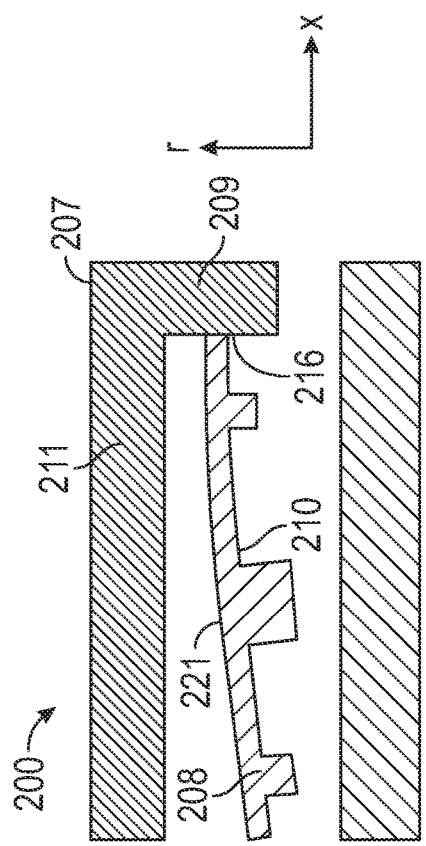
FIG. 2 is a side, elevational, cross-sectional view of a hydrostatic seal assembly according to an aspect of the disclosure.
Figure 3:
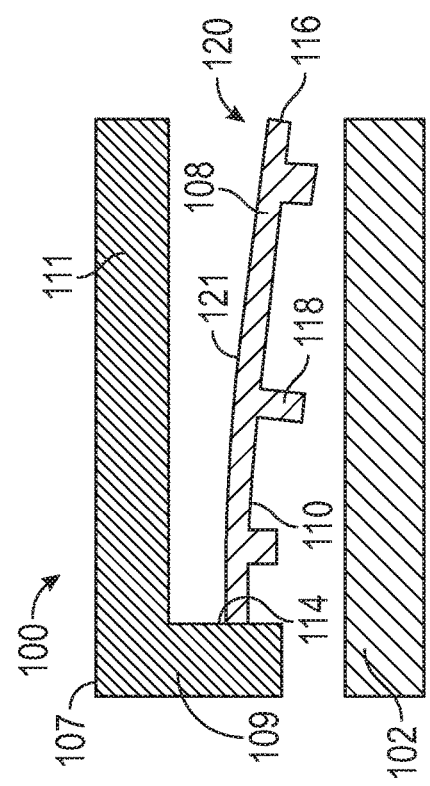
FIG. 3 is a top view of a portion of the hydrostatic seal assembly of FIG. 2.

FIGS. 2 and 3 illustrate a hydrostatic seal indicated generally at 100. The hydrostatic seal 100 is intended to create a seal between two relatively rotating components, such as a fixed stator and a rotating rotor 102. The hydrostatic seal 100 includes a housing 107 and a shoe 108, which is located in a non-contact position along the exterior surface of the rotor 102. The shoe 108 is formed with a sealing surface 110. For purposes of the present disclosure, the term "axial" or "axially spaced" refers to a direction along the rotational axis of the rotor, whereas "radial" refers to a direction perpendicular to the rotational axis of the rotor. The Figures illustrate axial direction x, radial direction r, and circumferential direction θ.

Rather than relying on a spring element to counterbalance the aerodynamic forces generated on the shoe 108 by an airflow, the embodiments described herein include a cantilevered beam as the shoe 108. Therefore, the shoe 108 is connected to the housing 107 of the seal 100 in a pinned manner or some suitable alternative mechanical fastener that allows pivoting movement of the shoe 108, relative to the housing 107. The housing 107 is fixed to a static structure. In the embodiment of FIGS. 2 and 3, the shoe 108 is pinned (i.e., cantilevered) to the housing 107 at a forward axial end 114 of the shoe 108, while an aft axial end 116 of the shoe 108 is free and not operatively coupled to any other structure. The housing 107 includes a first segment 109 extending radially and a second segment 111 extending axially rearward from the first segment 109. In the illustrated embodiment, the shoe 108 is cantilevered to the first segment 109 of the housing 107, thereby providing a closed front end of the seal 100 and an open rear end of the seal 200.

The initial assembly location of the shoe 108 has a defined radial gap between the shoe 108 and the rotating surface. A plurality of teeth 118 are included on the sealing surface 110 of the shoe 108. In operation, as the airflow between the shoe 108 and rotor 102 increases, the pressure field under the teeth 118 will be dropped to a lower pressure than the exit pressure in a cavity 120 aft of the teeth 118. The reduction in pressure across the shoe 108 causes a net aerodynamic force acting on the shoe 108 such that the force balance between the aerodynamic forces on the outer diameter 121 of the shoe 108 and the inner diameter, i.e., sealing surface 110, causes the shoe 108 to be moved radially inwardly toward the rotor 102, thus decreasing the gap until the seal reaches an equilibrium position considering the increased spring force of the displaced cantilevered beam. Conversely, in operation, when the gap closes below a desired level, the aerodynamic force on the inner diameter 110 across the shoe 108 increases, causing an increase in radial pressure force, which overcomes the force on the outer diameter 121, thus forcing the shoe 108 radially outwardly from the rotor 102 until the seal reaches an equilibrium position considering the spring force of the displaced cantilevered beam. The cantilevered shoe 108 deflects and moves to create a primary seal of the gap between the rotor and stator within predetermined design tolerances.

Figure 4:
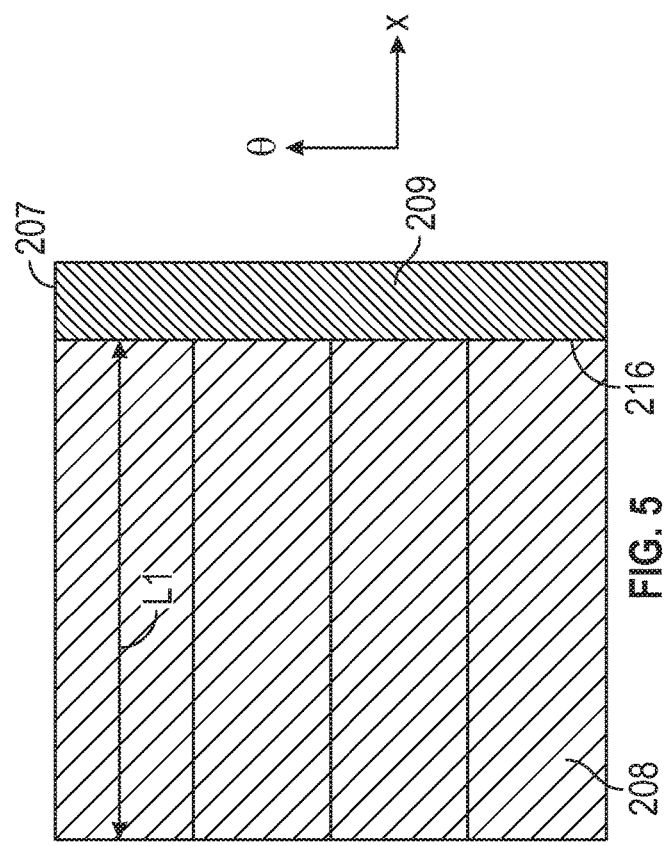
FIG. 4 is a side, elevational, cross-sectional view of a hydrostatic seal assembly according to another aspect of the disclosure.
Figure 5:
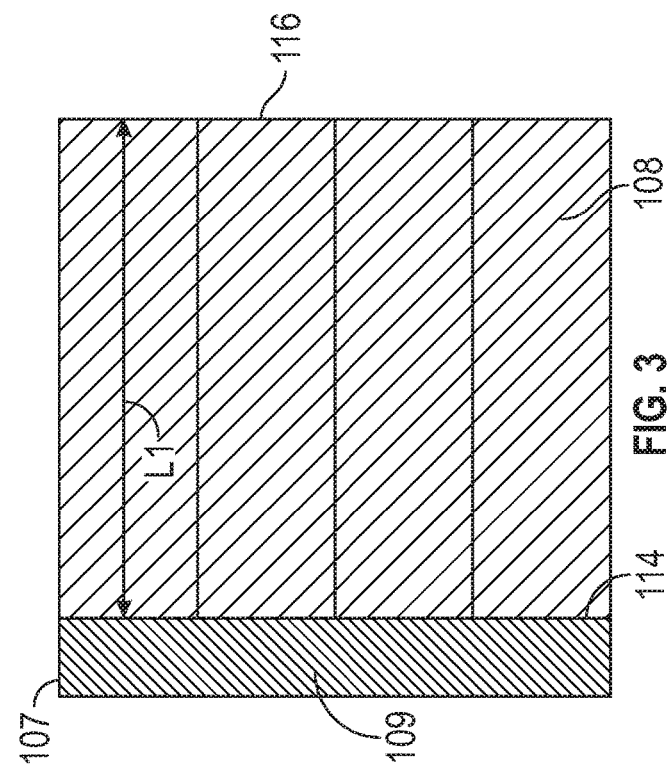
FIG. 5 is a top view of a portion of the hydrostatic seal assembly of FIG. 4.

Referring now to FIGS. 4 and 5, other embodiments of a cantilevered hydrostatic seal are illustrated and referenced generally with numeral 200. As shown, the hydrostatic seal 200 is secured to housing 207 at an opposite end of shoe 208 when compared to the embodiments of FIGS. 2 and 3. In particular, the aft end 216 the shoe 208 is pinned, or otherwise cantilevered, to the housing 207. The housing 207 includes a first segment 209 extending radially and a second segment 211 extending axially forward from the first segment 209. In the illustrated embodiment, the shoe 208 is cantilevered to the first segment 209 of the housing 207, thereby providing an open forward end of the seal 200 and a closed rear end of the seal 200. This may be characterized as a "reversed" cantilevered embodiment, when compared to the embodiments illustrated in FIGS. 2 and 3. In such an embodiment, due to the open front end of the seal 200, the outer diameter 221 of the cantilevered shoe 208 is subject to high pressure and the inner diameter, i.e., sealing surface 210 of the shoe 208, will be at a lower pressure.

Figure 6:
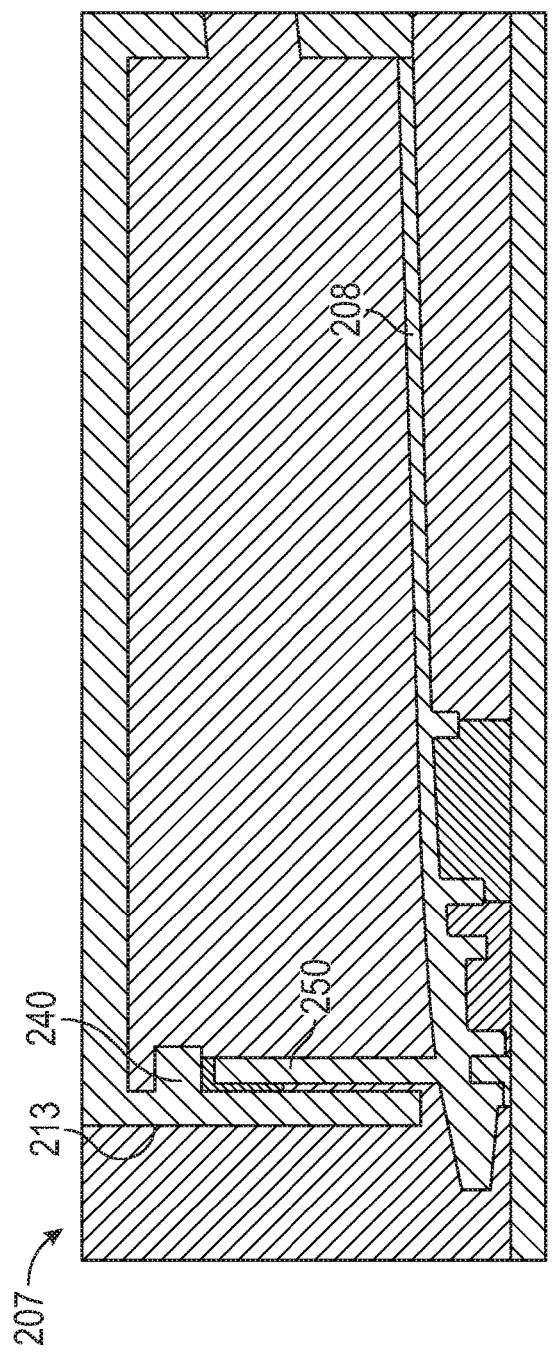
FIG. 6 is a side, elevational, cross-sectional view of a hydrostatic seal assembly according to another aspect of the disclosure.

FIG. 6 shows a "reversed" cantilevered shoe 208, as described in detail with FIGS. 4 and 5, but the housing 207 includes a third segment 213 that extends radially inwardly from the front end of the second axially extending segment 211. The third segment 213 includes a discourager feature 240 extending axially rearward from the third segment 213 to provide a non-contacting secondary sealing feature. The shoe 208 includes a sealing segment 250 extending radially outward to be in close proximity to the third segment 213 and the discourager feature 240, but is not in contact with the housing 207. It should be understood by a person of ordinary skill in the art that additional geometries for creating a secondary sealing feature could be implemented within the current embodiment of the invention.

Figure 7:
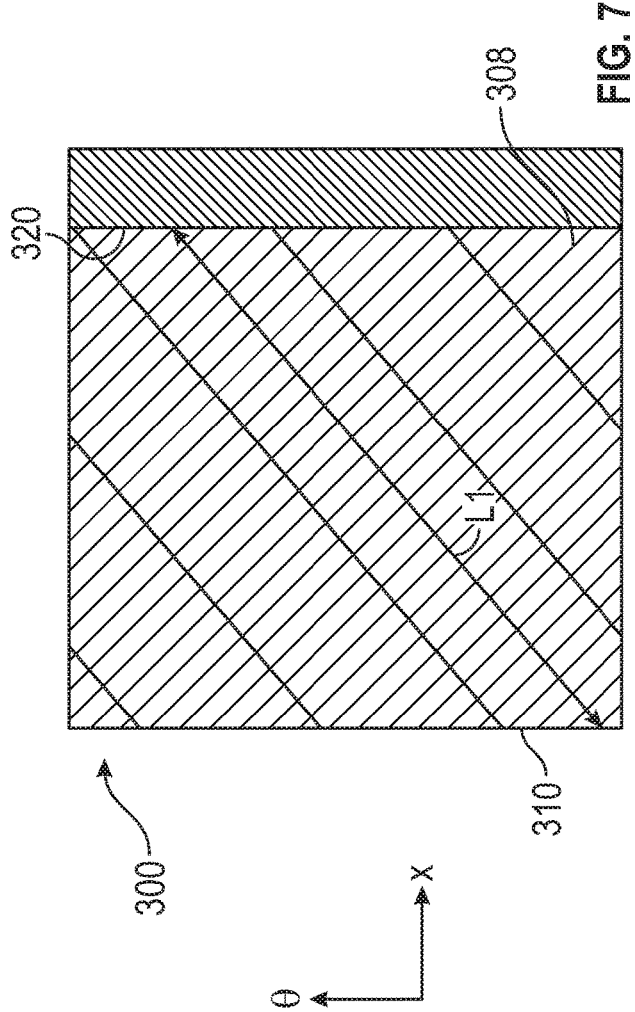
FIG. 7 is a top view of a hydrostatic seal assembly according to another aspect of the disclosure.

Referring now to FIG. 7, another embodiment of the hydrostatic seal is shown and referenced with numeral 300. The seal 300 functions in the same manner as the above-described seals 100, 200, but seal 300 includes an axially skewed cantilevered shoe 308. In particular, the shoe 308 extends axially from a first axial end 310 to a second axial end 320, but at an angle that is not parallel to the longitudinal centerline of the rotor 102, or gas turbine engine centerline. Specifically, the shoe 308 extends axially and circumferentially to provide a longer shoe 308—when compared to length L1 of shoes 108, 208 (FIGS. 3 and 5)—over the same axial footprint. Therefore, the overall length L2 of the cantilevered shoe 308 is increased without changing the axial length. The seal 300 may deflect to a greater extent and offer enhanced sealing capability.

The cantilevered seals described herein are frictionless and are more robust to wear, when compared to prior hydrostatic seals that have contact between stationary and moving components that, due to friction, can cause the shoe to become fully or partially pinned in place, and be unable to avoid contact with the rotor during a transient maneuver. The seals described herein are designed to eliminate rotor contact. Frictional loads are difficult to characterize and can change over the life of the seal and lead to flutter. The embodiments described herein avoid such problems.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal configured to be disposed between relatively rotatable components, the seal comprising:
   a seal housing; and
   a shoe extending axially from a forward end to an aft end to define an axial length, the shoe secured to the seal housing at the forward end and cantilevered to the seal housing such that the hydrostatic seal has a closed front end and an open rear end where the aft end is free and not operatively coupled to any other structure.

2. The seal of claim 1, wherein the seal does not include a spring element disposed between the shoe and the seal housing.

3. The seal of claim 1, wherein the seal housing comprises a first segment extending radially and a second segment extending axially rearward from the first segment, the shoe cantilevered to the first segment.

4. The seal of claim 1, wherein the shoe includes a plurality of teeth extending radially from a sealing surface of the shoe.

5. The seal of claim 1, wherein the shoe extends circumferentially to define an overall length of the shoe that is greater than an axial length of the shoe.

6. A hydrostatic seal configured to be disposed between relatively rotatable components, the seal comprising:
   a seal housing; and
   a shoe extending axially from a forward end to an aft end to define an axial length, the shoe, the shoe secured to the seal housing at the aft end and cantilevered to the seal housing such that the hydrostatic seal has a closed rear end and an open front end where the forward end is free.

7. The seal of claim 6, wherein the seal housing comprises a first segment extending radially and a second segment extending axially forward from the first segment, the shoe cantilevered to the first segment.

8. The seal of claim 7, the seal housing including a third segment extending radially from a forward end of the second segment, the seal housing including a discourager feature extending axially from the third segment, the shoe including a radially extending segment disposed proximate the discourager feature.

9. A seal assembly disposed in a gas turbine engine, the seal assembly comprising:
   a first component;
   a second component, the first component and the second component relatively rotatable components; and
   a first hydrostatic seal disposed between the first component and the second component, the seal comprising:
      a seal housing; and
      a shoe extending axially from a forward end to an aft end to define an axial length, the shoe secured to the seal housing at the forward end and cantilevered to the seal housing such that the hydrostatic seal has a closed front end and an open rear end where the aft end is free and not operatively coupled to any other structure.

10. The seal assembly of claim 9, wherein the seal housing comprises a first segment extending radially and a second segment extending axially rearward from the first segment, the shoe cantilevered to the first segment.

11. The seal assembly of claim 9, wherein the shoe includes a plurality of teeth extending radially from a sealing surface of the shoe.

12. The seal assembly of claim 9, wherein the shoe extends circumferentially to define an overall length of the shoe that is greater than an axial length of the shoe.

13. The seal assembly of claim 9, wherein the first component is a stator and the second component is a rotor.

14. The seal assembly of claim 13, wherein the seal is operatively coupled to the rotor.

* * * * *